W. N. DICKINSON, Jr.
ALTERNATING CURRENT ELECTRIC MOTOR.
APPLICATION FILED JULY 3, 1906.
1,014,210.  Patented Jan. 9, 1912.
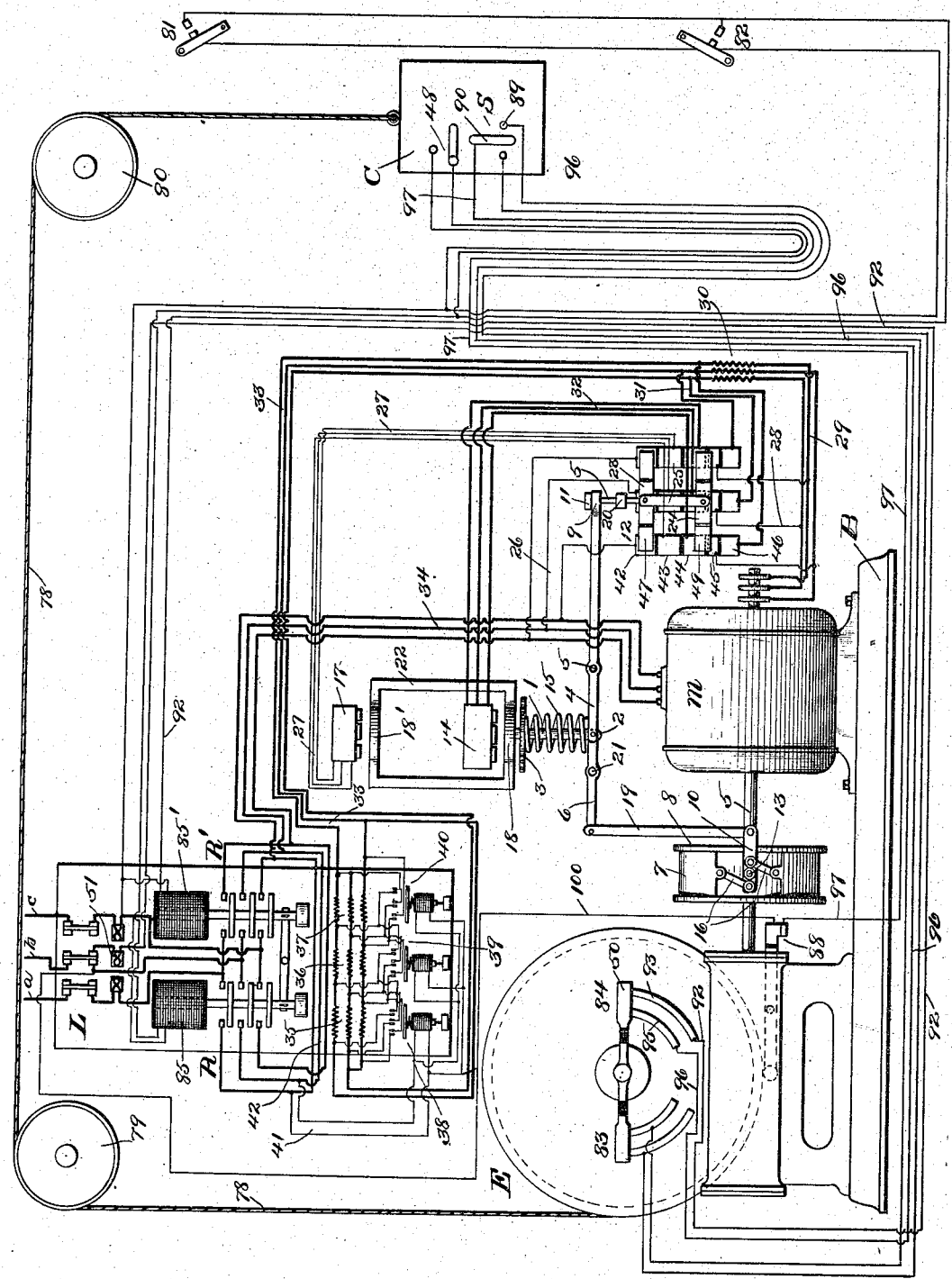
Attest:
D. Mitchell
Walter C. Strang
Inventor:
William N. Dickinson, Jr.
by Chas. M. Nissen Atty.

UNITED STATES PATENT OFFICE.

WILLIAM N. DICKINSON, JR., OF NEW YORK, N. Y., ASSIGNOR TO OTIS ELEVATOR COMPANY, OF JERSEY CITY, NEW JERSEY, A CORPORATION OF NEW JERSEY.

ALTERNATING-CURRENT ELECTRIC MOTOR.

1,014,210.  Specification of Letters Patent. Patented Jan. 9, 1912.

Application filed July 3, 1906. Serial No. 324,539.

*To all whom it may concern:*

Be it known that I, WILLIAM N. DICKINSON, Jr., a citizen of the United States, residing at New York city, borough of Brooklyn, State of New York, have invented a new and useful Improvement in Alternating-Current Electric Motors, of which the following is a specification.

My invention relates to alternating current motor controlling apparatus and one of its objects is the provision of means for operating alternating current electric brakes in conjunction with motors, with minimum consumption of current.

A further object of the invention is the provision of means for efficiently operating brake apparatus for electric motors without materially adding to the starting current required by the motor.

More particularly it is the object of the present invention to provide an alternating current electro-magnet for releasing the brake, an additional electro-magnet for holding the brake in released position, and switch apparatus for deënergizing the releasing electro-magnet and energizing the holding electro-magnet.

Other objects of my invention will appear hereinafter, the novel combinations of elements being pointed out in the claims.

In the accompanying drawing I have illustrated my invention applied to an alternating current electric elevator system, but its application may be general.

M designates a motor of any desired type, preferably, however, a multiphase induction motor comprising a squirrel cage rotor, or a rotor so wound that it may be suitably connected with an exterior starting device containing sectional resistances.

E designates the hoisting apparatus to which the car C is connected by means of the hoisting cable 78 passing over the sheaves 79 and 80.

5 designates the rotor shaft on which is mounted the brake pulley or coupling 8, the brake 7 being associated with the latter and connected by means of links and levers to the brake-releasing and holding apparatus and also to the switch device 12.

One of the objectionable features experienced in adding an electric brake to an alternating current winding machine or a hoisting device, has been the excessive current required by the brake at a time practically coincident with that at which the maximum current, namely, the starting current, was required by the motor. It is a well known fact that the current required to hold the brake in " off " position, after the magnetic circuit of the brake magnet has been closed, is but a small fraction of that required to lift or release the brake when the latter is of the regular type. In other words, the current required when the magnetic circuit is closed is but a small fraction of that when the magnetic circuit is open.

It is the principal object of the present invention to so adjust the brake apparatus to the starting conditions, that the current required to start the elevator does not exceed that required for the motor, save for the small amount of current required to retain the brake in released position, with the magnetic circuit of the brake magnet closed. I therefore employ the regular type of alternating current brake magnet 14 and add to the same a second magnet 17 which may be smaller in size and which is designed only to hold the brake in " off " position after it has been lifted to such position by the larger magnet 14. To the coils of the releasing magnet 14 are connected at starting the secondary circuit 29 of the induction motor by means of the leads 32, a portion of the switch 12, and the leads 28. This releasing magnet 14 may be connected to the secondary circuit or rotor circuit of the motor either directly and as a sole connection across said secondary circuit at starting, or it may be connected in shunt with or in series with resistance or reactance, or even with a condenser. In this instance, however, I have connected the magnet 14 across the resistances 30, 35, 36 and 37. Taking, however, the case of a multiphase induction motor, in which, at starting, this releasing magnet 14 is connected in shunt with ohmic resistance across the collector or slip rings of the secondary member or rotor of the motor, it will be clear that upon the usual conditions, the excess current required to start the motor under load will provide more than sufficient energy in the secondary circuit to lift or release the brake. It will be further apparent that, owing to the fact that current from the secondary circuit of the motor is passed through the coils of the brake magnet, this secondary current will be displaced in phase from the position most advantageous for obtaining maximum torque in the secondary member of the motor. If, however, the switch 12 is designed to connect the primary circuit 34 of the line to the coils of the second or holding magnet 17 after the latter's magnetic circuit has been completed, and arrangement is made to have this switch actuated either by the upward movement of the brake or by other means which will provide the proper time connection, it will be clear that not only will the current draft from the main circuit not be increased above that required by the motor, save for the small current required to hold the brake in "off" position after it has been lifted to that position, but, if in combination with the first switch, a second switch is designed to simultaneously, or approximately so, disconnect the first brake magnet 14 from the secondary circuit, it will be equally clear that the condition of reduced torque, owing to detrimental displacement of phase in the secondary circuit, will exist only for a moment. Furthermore, after the second switch is closed, the motor may exert its full starting torque under the most favorable conditions for which it has been designed.

Although any suitable switch 12 may be used in connection with the brake apparatus, I have herein shown for the purpose of illustration, a simple electric switch comprising three vertically arranged and fixed contact carrying devices. Over the fixed contacts are adapted to slide the cross bars 23 and 24 which are connected by the vertical bar 25. The cross bars 23 and 24 carry insulated contacts at their outer ends which are adapted to coöperate with the fixed contacts. Furthermore the cross bars 23 and 24 together with the vertical connecting bar 25, are secured to the rod 5 so that all of these parts move together.

The uppermost fixed contacts 42 are connected by the leads 26 to the primary circuit 34, and the outer contacts 47 of the cross bar 23 normally engage said uppermost fixed contacts. The insulated fixed contacts 43 immediately below the uppermost fixed contacts are connected by means of the wires 27 to the holding electro-magnet 17. The next lower fixed contacts are connected by the conductors 32 to the releasing electro-magnet 14. These fixed contacts 44 are normally connected by means of the outer contacts 49 of the cross bar 24 to the fixed contacts 45, which are in turn connected by means of the conductors 28 to the secondary or rotor circuit 29 of the motor M. The lowermost fixed contacts 46 are connected by means of the wires 31 to the conductors 33 of the starting device beyond the resistance 30. Besides the starting resistance 30 there may be additional starting resistances 35, 36 and 37 to obtain any degree of refinement of acceleration desired.

Now when the switch S in the car C is moved onto one of its contacts, say that designated 89, a circuit will be closed through one of the reversing switch magnets 85 or 85', in this instance that designated 85'. The circuit may be traced from the lead c to the solenoid or magnet 85', wire 92, contacts 93, 95, and bridge piece 50 of the machine limit switch 84, wire 96, contact 89, lever 90, wire 97, slack cable switch 88, wire 100, to one of the other leads, in this instance that designated b. Upon the energization of the reversing switch magnet 85' the reversing switch R' will be closed and the stator circuit 34 will at once receive current and the current induced in the secondary or rotor of the motor will supply current through the leads 29 and 28, and thence through the fixed contacts 45, 44, and the movable contacts 49 to the conductors 32 and thence to the releasing electro-magnet 14. The latter will quickly act on the armature 18 to lift the same together with the rod 1 against the action of the spring 15 and thus release the brake 7 through the medium of the lever 6 which is pivoted at 21, and the link 19 which is connected between the lever 6 and the lever 10. The lever 10 has a fixed pivot at 13 and is connected to the brake 7 by means of the toggles 16. The rod 1 is pivoted at its lower end at the point 2 to the lever 6 and also to the lever 4 which has a fixed pivot at 5.

Now when the releasing magnet 14 is energized and the armature 18 together with the brake is lifted, the outer end of the lever 4 is moved downwardly. In this instance said outer end of the lever 4 is loosely connected to the rod 5 as by means of a link or collar 9 against which the stop 11 on the rod 5 may abut. As shown, the cross bars 23 and 24 are arranged vertically and will therefore descend by gravity when released, but this may be otherwise arranged if desired, and a retarding device used in connection therewith so that they will move downwardly at any predetermined rate of speed. In this instance the inertia and friction of the moving parts of the switch 12 are relied upon to furnish the small time element desired to accomplish the object, and the end 9 of the lever 4 is so arranged as to strike a shoulder 20 on rod 5 in the event of its failing to drop promptly on being released. This guards against any tendency of the switch to fail to operate.

When the current is first supplied to the motor, the resistances 30, 35, 36 and 37 are all connected to the secondary circuit, and the electro-magnet 14 is connected in shunt thereto. As soon as the reversing switch R' is closed, current is supplied by means of the leads 42 and 41 to the accelerating magnets of the switches 38, 39 and 40. These accelerating magnets may be arranged in any well known manner to operate successively so as to short circuit the resistances 35, 36 and 37 step by step, and thus permit the motor to gradually increase in speed. The switch 12 is arranged to short-circuit the resistance 30 before the switches 38, 39 and 40 begin to operate as it is desired to employ current for the releasing magnet 14 only momentarily.

It should be noted that when the magnet 14 is energized and the armature 18 drawn upwardly to effect the release of the brake and the switch 12, the frame 22 is also moved upwardly to bring the armature 18' into engagement with the holding electro-magnet 17 to close its magnetic circuit. As stated heretofore, after the magnetic circuit of an alternating current electro-magnet has been closed, it requires only a small current to maintain it sufficiently energized so that it may hold the brake in released position. As soon as the switch 12 is released, the contacts 47 will connect the fixed contacts 42, 43, substantially at the same time or a short time before the contacts 49 leave the fixed contacts 44. This action of the switch 12 effects the energization of the holding magnet 17 and the deënergization of the releasing magnet 14, and also the short-circuiting of the resistance 30, as explained hereinbefore.

The limit switches 81 and 82 and the safety switch 48 in the car are for the purpose of energizing the tripping coil 51 of the main line switch L to effect the opening of the latter and the consequent stopping of the motor-hoisting apparatus and car. This, however, is no part of the present invention and is therefore not explained in detail. It is however described and claimed in my copending application, Serial No. 321,692, filed June 14, 1906, for an improvement in safety devices for alternating current hoisting apparatus.

When the switch S in the car is opened, of course the reversing switch which has been operated will also be opened and the holding magnet 17 will be deënergized as the primary circuit 34 and the leads 26 no longer receive current. The frame 22 will therefore be released and the spring 15 will apply the brake to stop the motor and the link or collar 9 will strike the stop 11 to move the rod 5 and the cross bars 23 and 24 to their upper positions, as shown in the drawings.

Obviously those skilled in the art may make various changes in the details and the arrangement of parts without departing from the spirit and scope of my invention as defined by the claims, and I desire therefore not to be limited to the precise construction herein disclosed.

Having thus fully described my invention, what I claim and desire to have protected by Letters Patent of the United States is:—

1. The combination with a motor, of a brake therefor, electroresponsive means for releasing the brake, a holding device for maintaining the brake in released position, and an automatic switch for rendering effective said holding device after the brake has been released.

2. The combination with a motor, of brake apparatus therefor, electroresponsive means for releasing said brake apparatus, electromagnetic mechanism for holding said brake apparatus in released position, devices coacting with said releasing means to close the magnetic circuit of said electromagnetic mechanism before its electric curcuit is closed, and switch appliances operated by said releasing means for controlling the latter and said electromagnetic mechanism.

3. The combination with a motor, of brake apparatus therefor, means independent of movement of any part of the motor for releasing said brake apparatus, an alternating current holding electro-magnet, and connections to close the magnetic circuit of said holding magnet and afterward close its electric circuit.

4. The combination with a motor, of a brake therefor, brake-applying mechanism, electroresponsive means to release the brake, an alternating current holding electro-magnet, and means for almost simultaneously completing the magnetic and electric circuits of said holding electro-magnet and acting upon said brake-applying mechanism to effect the release of the brake.

5. The combination with an alternating current electric motor, of brake apparatus therefor, an alternating current electro-magnet for releasing said brake apparatus, an additional alternating current electro-magnet for holding the brake apparatus in released positoin, and a switch for closing the electric circuit of said holding electro-magnet after its magnetic circuit is closed.

6. The combination with an alternating current motor, of brake apparatus therefor, means independent of movement of the motor for releasing said brake apparatus, an alternating current holding electro-magnet, and appliances co-acting with said brake-releasing means to close the magnetic circuit of said electro-magnet and thereafter close the electric circuit thereof.

7. The combination with a motor, of a brake therefor, brake-applying apparatus, a holding electro-magnet, electroresponsive means for acting upon said brake-applying apparatus to release the brake and to complete the magnetic circuit of said holding electro-magnet, and a switch for controlling said actuating means and said holding magnet.

8. The combination with a motor, of a brake therefor, brake-applying apparatus, an electromagnetic brake-releasing device, a holding magnet, and a single switch for controlling said brake-releasing device and said holding magnet.

9. The combination with a motor, of a brake therefor, a holding magnet, means for releasing said brake and completing the magnetic circuit of said holding magnet, and a single switch independent of the motor for controlling the energization of said holding magnet.

10. The combination with a motor, of a brake therefor, brake-applying apparatus, an electro-magnet for acting upon said apparatus to release the brake, a holding magnet, means operated upon the release of the brake for closing the magnetic circuit of said holding magnet, and an electric switch for effecting the energization of the holding magnet and the deënergization of the releasing magnet upon the release of the brake.

11. The combination with an alternating current motor, of a brake therefor, brake-applying apparatus, an alternating current releasing magnet, an alternating current holding magnet, means operated by the releasing magnet for closing the magnetic circuit of the holding magnet when the brake is released, and a switch operating to supply current to the holding magnet and to cut off current from the releasing magnet after the former's magnetic circuit is completed.

12. The combination with a multiphase motor, of a brake therefor, brake-applying apparatus, a multiphase electro-magnet for acting upon said apparatus to release the brake, a multiphase holding electro-magnet, a device operated by said releasing magnet upon the release of the brake for completing the magnetic circuit of the holding electro-magnet, a switch, means operated by the brake-applying apparatus for holding said switch in normal position, and connections between said switch and said electro-magnets to effect the energization of only the releasing magnet until the magnetic circuit of the holding magnet is closed and the brake released and thereafter effect the energization of the holding magnet and the deënergization of the releasing magnet.

13. The combination with a movable member, of a magnet for actuating said member to a predetermined position, an additional magnet operable when energized to hold said member in such position, and a switch operated by said member to control said magnets.

14. The combination with a movable member, of an armature connected thereto, a magnet for attracting said armature to move said member, an additional armature, an additional magnet, a connection between said armatures to effect the movement of the additional armature against said additional magnet to close the magnetic circuit of the latter, and a switch operated by said member to control the current through said magnets.

15. The combination with a movable member, of an electro-responsive device for moving said member, an additional electro-responsive device for holding said member after the magnetic circuit of said additional electro-responsive device has been closed by the operation of the first device, and a switch connected to said member to permit the flow of current first through only the first device, then through the second device, and finally through the latter only.

16. The combination with a brake, of brake-releasing means comprising an alternating current magnet, a holding electro-magnet, an armature for the latter for closing its magnetic circuit upon the release of the brake, an electric switch operated by said alternating current magnet to close the circuit through said holding magnet after its magnetic circuit is closed, an electric motor, starting resistance therefor, and an additional switch connected to operate with the first-named switch to cut out said resistance.

17. The combination with brake apparatus, of an electro-responsive device for operating said brake apparatus to releasing position, a holding electro-magnet, an armature connected to said electro-responsive device and operated thereby to close the magnetic circuit of said electro-magnet, an electric switch operated by said device to close the circuit for said electro-magnet after its magnetic circuit is closed, an electric motor, starting resistance therefor, and an additional switch movable with said first-named switch to cut out said resistance after the brake is released.

In testimony whereof, I have signed my name to this specification in the presence of two subscribing witnesses.

WILLIAM N. DICKINSON, Jr.

Witnesses:
CHARLES M. NISSEN,
W. H. BRADY.

---

Copies of this patent may be obtained for five cents each, by addressing the "Commissioner of Patents, Washington, D. C."